United States Patent
Kiyokawa

(10) Patent No.: US 6,204,877 B1
(45) Date of Patent: Mar. 20, 2001

(54) ELECTRONIC IMAGE PICKUP SYSTEM FOR TRANSMITTING IMAGE DATA BY REMOTE-CONTROLLING

(75) Inventor: Izuru Kiyokawa, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 08/896,643

(22) Filed: Jul. 18, 1997

Related U.S. Application Data

(63) Continuation of application No. 08/520,263, filed on Aug. 28, 1995, now abandoned.

(30) Foreign Application Priority Data

Sep. 9, 1994 (JP) .................................... 6-216150

(51) Int. Cl.$^7$ ............................ H04N 5/76; H04N 5/232
(52) U.S. Cl. ...................... 348/211; 348/16; 348/222; 348/233; 348/375; 348/552; 358/909.1
(58) Field of Search ................. 348/13, 14, 15, 348/16, 17–20, 207, 211, 212, 213, 231, 232, 233, 552, 333.01, 333.02, 333.04, 373, 374, 375, 376; 358/906, 909.1; H04N 5/232, 5/76, 5/225

(56) References Cited

U.S. PATENT DOCUMENTS

| | | | |
|---|---|---|---|
| 5,016,107 | * 5/1991 | Sasson et al. | 358/209 |
| 5,164,827 | * 11/1992 | Paff | 358/108 |
| 5,218,627 | * 6/1993 | Corey et al. | 379/53 |
| 5,305,098 | * 4/1994 | Matsunaka et al. | 348/65 |
| 5,305,100 | * 4/1994 | Choi | 348/159 |
| 5,335,014 | * 8/1994 | Elberbaum | 348/159 |
| 5,376,965 | * 12/1994 | Nagasaki et al. | 348/232 |
| 5,579,060 | * 11/1996 | Elberbaum | 348/705 |
| 6,008,867 | * 12/1999 | Cooper | 348/8 |

FOREIGN PATENT DOCUMENTS 6-35038   2/1994 (JP) .

* cited by examiner

Primary Examiner—Wendy Garber
Assistant Examiner—Ngoc-Yen Vu
(74) Attorney, Agent, or Firm—Frishauf, Holtz, Goodman, Langer & Chick, P.C.

(57) ABSTRACT

In order to provide an electronic image pickup system which can simplify the system arrangement, and can perform mutual transmission of image data and a remote-controlling operation, an electronic still camera on the master side transmits operation data for defining a photographing operation in accordance with an operation with respect to the camera on the master side to an electronic still camera on the slave side. The electronic still camera on the slave side receives the operation data from the master side, and performs a photographing operation corresponding to the operation data. The electronic still camera on the slave side transmits a picked-up image signal to the electronic still camera on the master side to display the image signal on the electronic viewfinder of the electronic still camera on the master side.

61 Claims, 12 Drawing Sheets

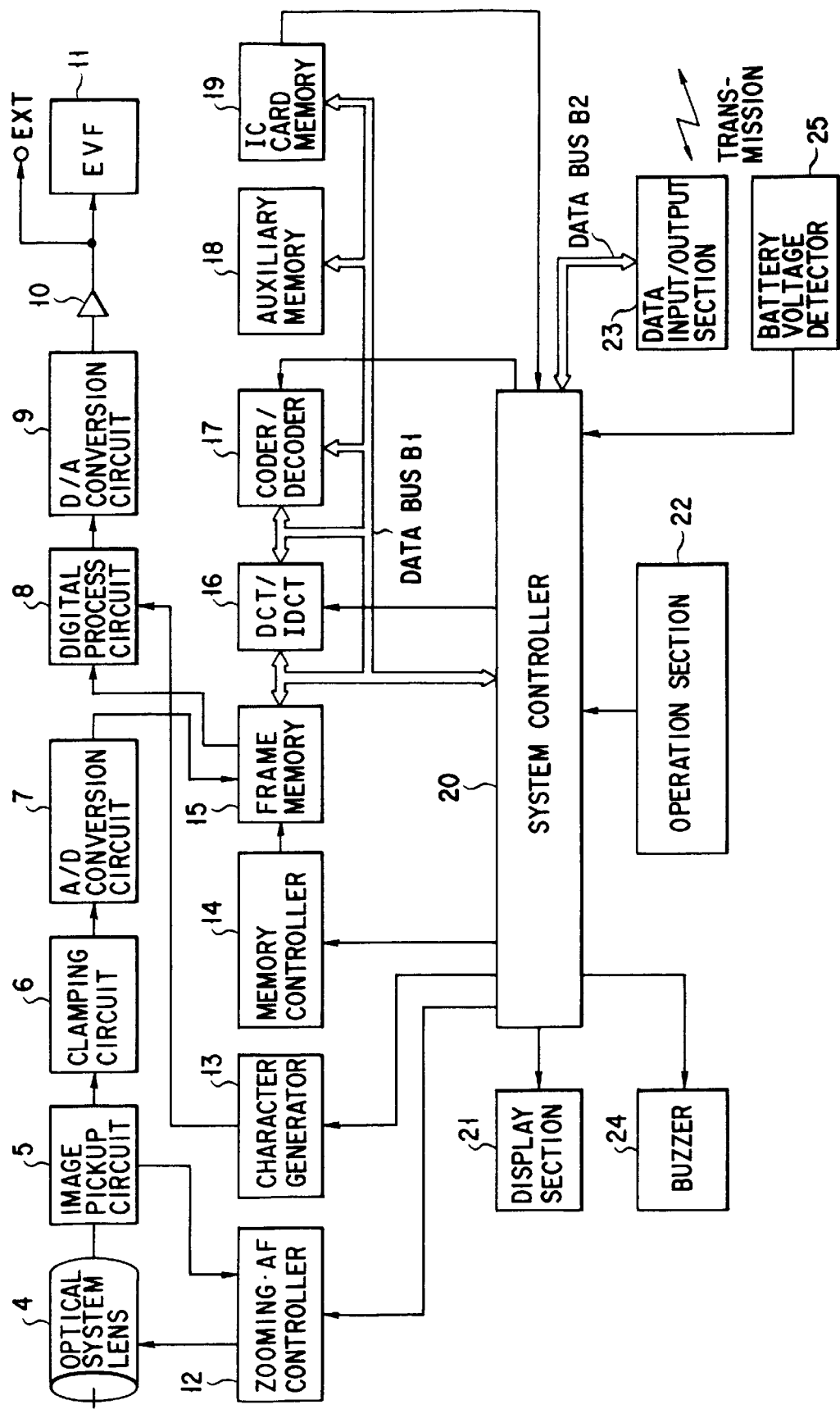
F I G. 2A

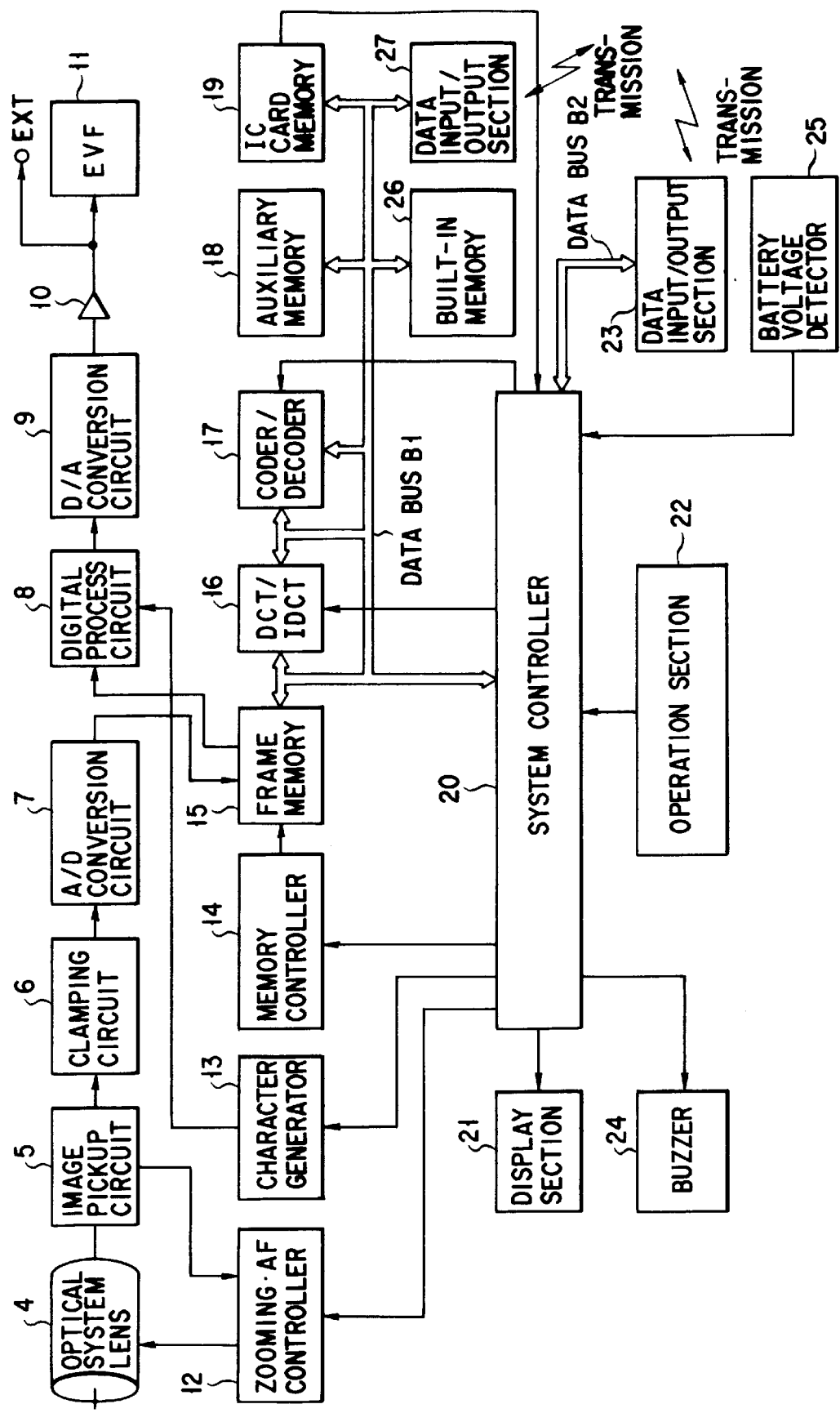
F I G. 2B

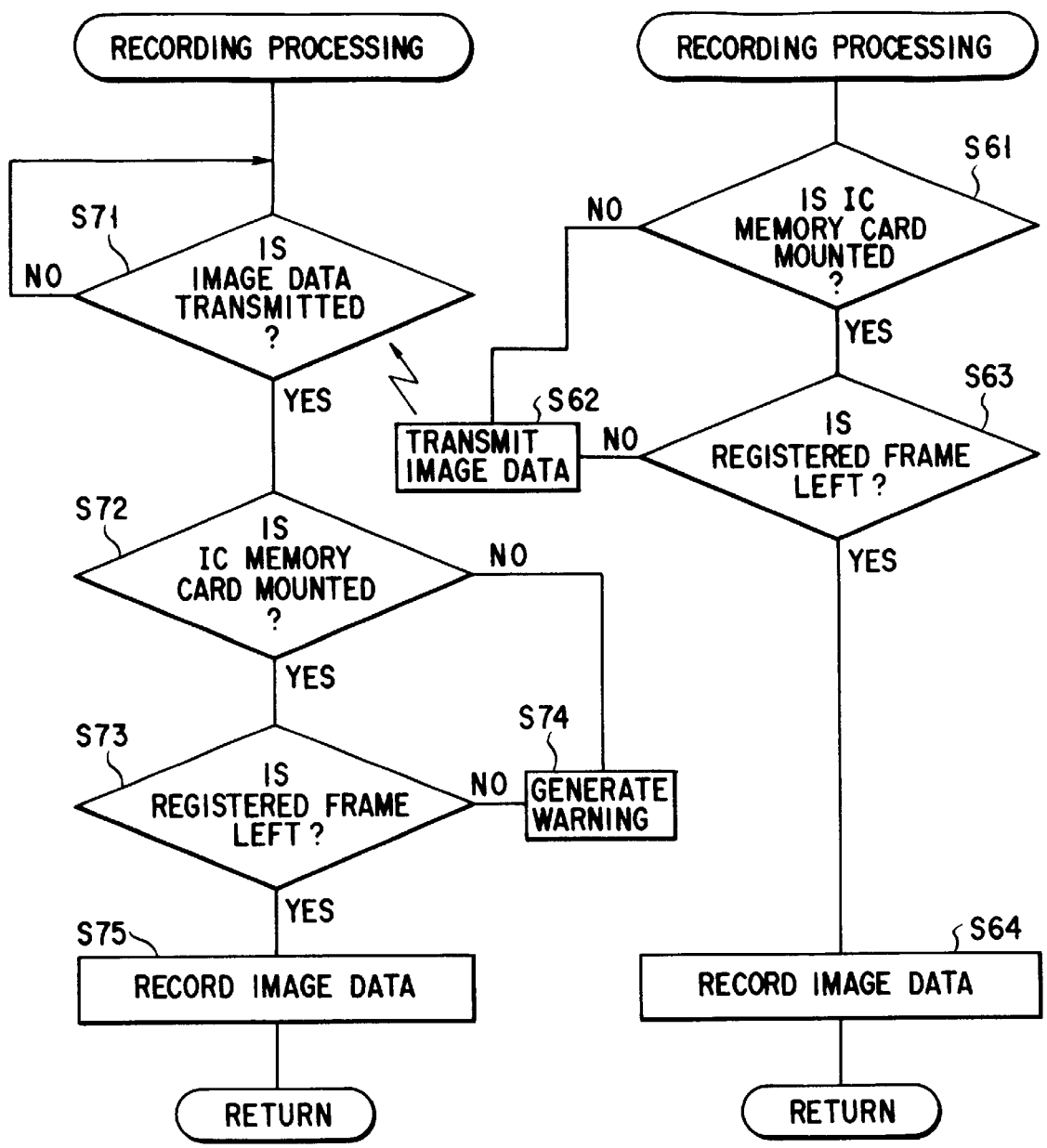
F I G. 9

ELECTRONIC IMAGE PICKUP SYSTEM FOR TRANSMITTING IMAGE DATA BY REMOTE-CONTROLLING

This application is a Continuation of application Ser. No. 08/520,263, filed Aug. 28, 1995, now abandoned.

BACKGROUND OF THE INVENTION

1. Field of the Invention

The present invention relates to an electronic image pickup system and, more particularly, to an electronic image pickup system in which an electronic image pickup apparatus can be operated through another electronic image pickup apparatus.

2. Description of the Related Art

As a conventional system for remote-controlling an electronic image pickup apparatus, for example, a monitor system using a monitor camera is generally used.

In this monitor system, an apparatus for remote control is arranged on the operating side, and a monitor camera is arranged on the operated side. The monitor camera is operated through the apparatus for remote control.

In such a conventional monitor system, however, a large, expensive apparatus for remote control is required, and mutual remote control cannot be performed.

For a system of this type, simplification and mutual remote control are required. No system capable of satisfying these requirements has been proposed.

Jpn. Pat. Appln. KOKAI Publication No. 6-35038 discloses a camera system in which a plurality of cameras are connected to each other via communication cables, and an arbitrary camera can be used to perform zooming and releasing operations with respect to the remaining cameras.

In the above camera system, however, images cannot be transmitted and received between the cameras.

In this system, therefore, a user cannot check an object image to be photographed with a camera on the operated side through a camera on the operating side.

SUMMARY OF THE INVENTION

It is, therefore, an object of the present invention to provide a new and improved electronic image pickup system in which the overall arrangement of the system can be simplified, and transmission of image data and remote control can be mutually performed between the respective electronic image pickup apparatuses in the system.

According to an aspect of the present invention, there is provided an electronic image pickup system including a plurality of similar electronic image pickup apparatuses capable of mutually exchanging information through communication means, comprising:

an electronic image pickup apparatus on an operating side, the apparatus being selected from the plurality of similar electronic image pickup apparatuses and playing a leading role in exchanging the information; and an electronic image pickup apparatus on an operated side, the apparatus being selected from the plurality of similar electronic image pickup apparatuses and exchanging the information in response to an operation of the electronic image pickup apparatus on the operating side, wherein the electronic image pickup apparatus on the operating side comprises control data transmission means for transmitting control data for defining at least one of photographing and recording operations to the electronic image pickup apparatus on the operated side in response to an operation with respect to the apparatus on the operating side, the electronic image pickup apparatus on the operated side comprises control data reception means for receiving the control data, and photographing operation control means for performing a photographing operation in accordance with the control data received by the control data reception means, and the electronic image pickup apparatus on the operated or operating side comprises image data transmission means for transmitting image data obtained by the apparatus upon photoelectric conversion and photography to the electronic image pickup apparatus on the operating or operated side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principle of the invention.

FIGS. 2A and 2B are block diagrams respectively showing the arrangement of an electronic still camera as an electronic image pickup apparatus of the present invention and its modification;

FIG. 9 is a flow chart showing the subroutine "recording processing" in FIG. 5;

DETAILED DESCRIPTION OF THE PREFERRED EMBODIMENTS

Figure 1:
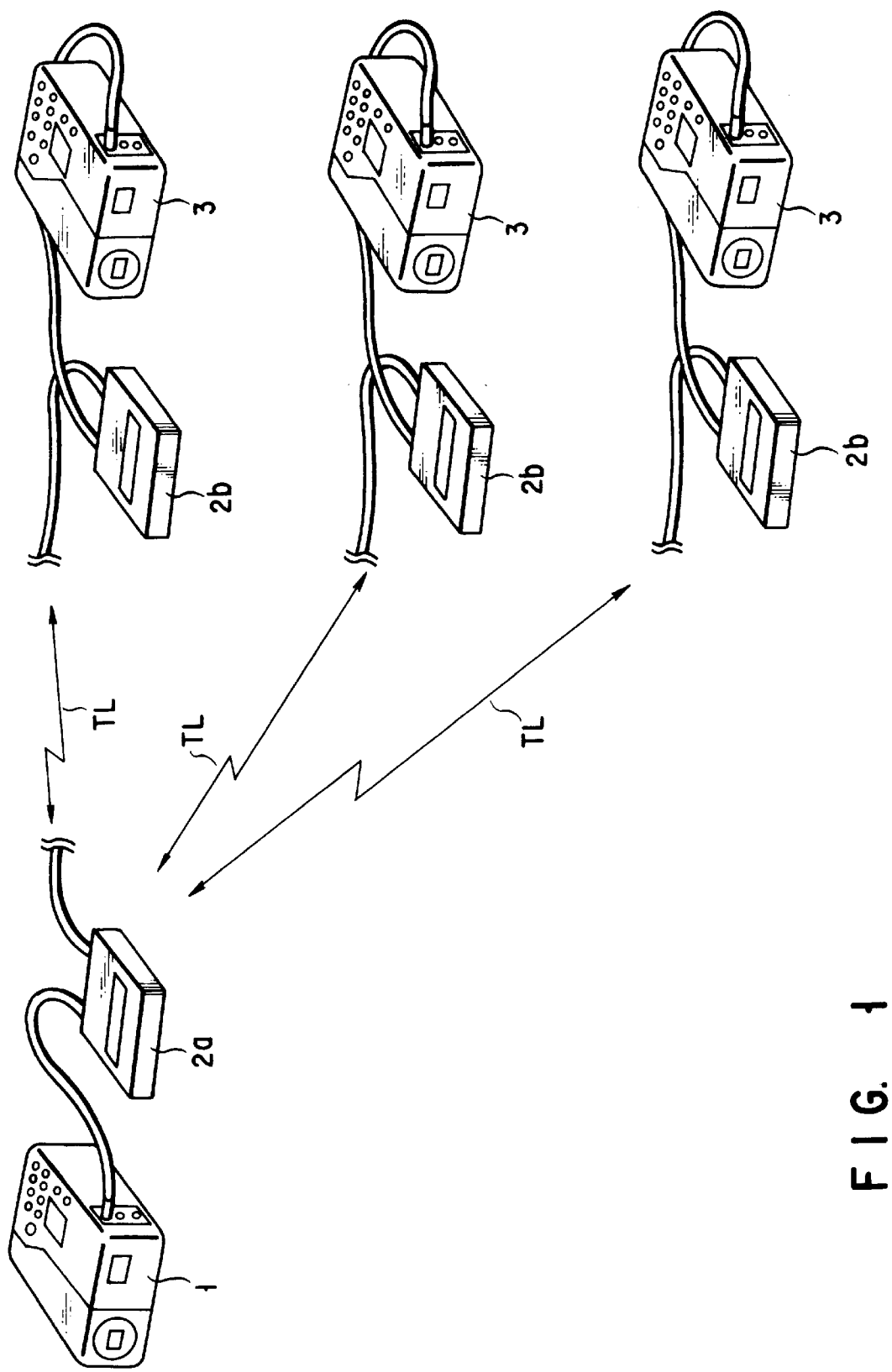
FIG. 1 is a perspective view showing the concept of an electronic image pickup system according to an embodiment of the present invention.

Reference will now be made in detail to the presently preferred embodiments of the invention as illustrated in the accompanying drawings, in which like reference characters designate the like or corresponding parts throughout the several drawings.

Embodiments of the present invention will be described below with reference to the accompanying drawings.

FIG. 1 is a perspective view showing the concept of an electronic image pickup system according to an embodiment of the present invention.

Referring to FIG. 1, reference numeral 1 denotes an electronic still camera serving as an electronic image pickup apparatus, which is connected to a telephone line TL via a modem 2a.

An electronic still camera 3 similar to the electronic still camera 1 (the same type and the same specifications in FIG. 1) is connected the other line which can be connected to the telephone line TL.

In addition, as shown in FIG. 1, electronic still cameras 3 are connected to the electronic still camera 1 via modems 2b in the same manner as described above.

In this embodiment, the electronic still camera 1 is arranged on the operating side (to be referred to as the master side hereinafter), and each electronic still camera 3 is arranged on the operated side (to be referred to as the slave side hereinafter). The electronic still camera 3 on the slave side can be remote-controlled through the electronic still camera 1 on the master side.

Note that a given camera can be arbitrarily set on the master or slave side by an operation method to be described later.

The operation of the electronic image pickup system of this embodiment will be described below.

The electronic still camera 1 on the master side transmits operation data as control data for defining at least one of photographing and recording operations to the electronic still camera 3 on the slave side in accordance with an operation performed for the electronic still camera 1. The electronic still camera 3 on the slave side receives the operation data and performs a photographing operation in accordance with the operation data.

The above operation may be manually performed by operating the operation section or automatically performed according to a control program.

The electronic still camera 3 on the slave side transmits picked-up image data to the electronic still camera 1 on the master side to output the image data to the electronic viewfinder of the electronic still camera 1 on the master side.

Note that a modem may be incorporated in the electronic still camera.

FIG. 2A is a block diagram showing the arrangement of an electronic still camera as an electronic image pickup apparatus of the present invention.

Referring to FIG. 2A, an object image is converted into an electrical signal by an image pickup circuit 5 having an image pickup device such as a CCD (Charge-Coupled Device) serving as a photoelectric conversion means through an optical system lens 4.

This electrical signal is subjected to predetermined clamping processing in a clamping circuit 6, and is converted into digital data by an A/D (analog/digital) conversion circuit 7. The digital data is then written in a frame memory 15.

A zooming •AF (autofocusing) controller 12 is subjected to zooming control in accordance with a zooming operation, and is also subjected to AF control on the basis of the electrical signal from the image pickup circuit 5.

Write/read access to the frame memory 15 is controlled by a memory controller 14 which is controlled by a system controller 20.

Image data read out from the frame memory 15 is subjected to digital processing in a digital process circuit 8 together with character data output from a character generator 13. The resultant data is converted into an analog signal by a D/A (digital/analog) conversion circuit 9.

The analog image signal is amplified by an amplification circuit 10 and is supplied to an external terminal EXT and an electronic viewfinder (EVF) 11.

In a data recording operation, image data read out from the frame memory 15 is subjected to quadrature transformation in a DCT/IDCT (Discrete Cosine Transform/Inverse Discrete Cosine Transform) circuit 16. The obtained quadrature coefficient is coded by a coder/decoder 17 and is subjected to compression processing by a compression scheme conforming to the JPEG (Joint Photographic Experts Group) scheme or the like.

The image data compressed in this manner is recorded on an IC memory card 19 serving as a recording medium.

The IC memory card 19 is detachably mounted in the apparatus body.

As is apparent, a medium, e.g., a hard disk, other than the above IC memory card can be used as a recording medium.

A data bus B1 connected to the card connector on which the IC memory card 19 is detachably mounted is an I/O data bus of the PCMCIA scheme. Various cards having the same physical specifications, e.g., outer shape and contact array, as those of the IC memory card 19 and conforming to the PCMCIA scheme can be connected to the card connector. For example, such cards include a communication modem card, a mask ROM card for supplying a control program to the camera body and a card for providing positional information such as a GPS (Global Positioning System) card or the like.

For example, various cards conforming to the PCMCIA scheme are communication cards including a modem card, a LAN card, an Ethernet card, a PCS (Personal Communication Service) card, a cellular telephone modem card, an iridium card (satellite telephone communication card), and an MCA (Micro Channel Architecture) card (a radio card for business use) or the like, and recording medium cards including an SRAM card, an ATA flash card, a mask ROM card, and the like.

Radio transmission/reception can be performed by using the cellular telephone modem card, the PCS card, and the MCA card or the like.

In a reproducing operation, image data read out from the IC memory card 19 is subjected to expansion processing in the coder/decoder 17 and the DCT/IDCT circuit 16. The resultant data is written in the frame memory 15.

The image data read out from the frame memory 15 is output to the external terminal EXT and the EVF 11 via the digital process circuit 8, the D/A conversion circuit 9, and the amplification circuit 10.

The system controller 20 exchanges data via the data bus B1 to control the overall camera operation.

For example, the system controller 20 controls the display operation of a display section 21 constituted by an LCD (Liquid Crystal Display) and the like, and also controls a camera operation on the basis of operation data from an operation section 22.

The system controller 20 also controls the character generator 13 to control a desired character information output, and controls communication with an external unit through a data bus B2 and a data input/output section 23.

An auxiliary memory 18 is a work memory used to perform various types of data processing.

A buzzer 24 generates a sound under the control of the system controller 20 when some auditory output is required in an operation.

A battery voltage detector 25 detects its own battery voltage.

FIG. 2B is a block diagram showing a modification of the electronic still camera in FIG. 2A.

The same reference numerals in FIG. 2B denote the same parts as in FIG. 2A, and a detailed description thereof will be omitted. The arrangement shown in FIG. 2B is different from that shown in FIG. 2A in that an built-in memory 26 and a data input/output section 27 are connected to a data bus B1.

This built-in memory 26 has the same function as that of the IC memory card 19. With this built-in memory 26, various cards conforming to the PCMCIA scheme can be connected to the card connector on which the IC memory card 19 is detachably mounted, as described above with reference to FIG. 2A.

The data input/output section 27 is a card connector having the same specifications as those of the card connector for the IC memory card 19. A communication card can be mounted on the data input/output section 27, as well as a recording medium card such as the IC memory card 19, to allow communication with an external unit.

With this arrangement, a 2-slot card connector is obtained. Since the built-in memory 26 is also arranged, a communication mode card may be mounted in one of the two slots, while a mask ROM is mounted in the other slot.

In this case, the camera has both the built-in memory 26 and the IC memory card 19. However, the present invention is not limited to this, and can be applied to a camera having only the IC memory card 19 or the built-in memory 26.

In this case, the camera has both the data input/output section 23 and the data input/output section 27. However, the present invention is not limited to this, but can be applied to a camera having only one of the data input/output section 23 and the data input/output section 27.

Figure 3:
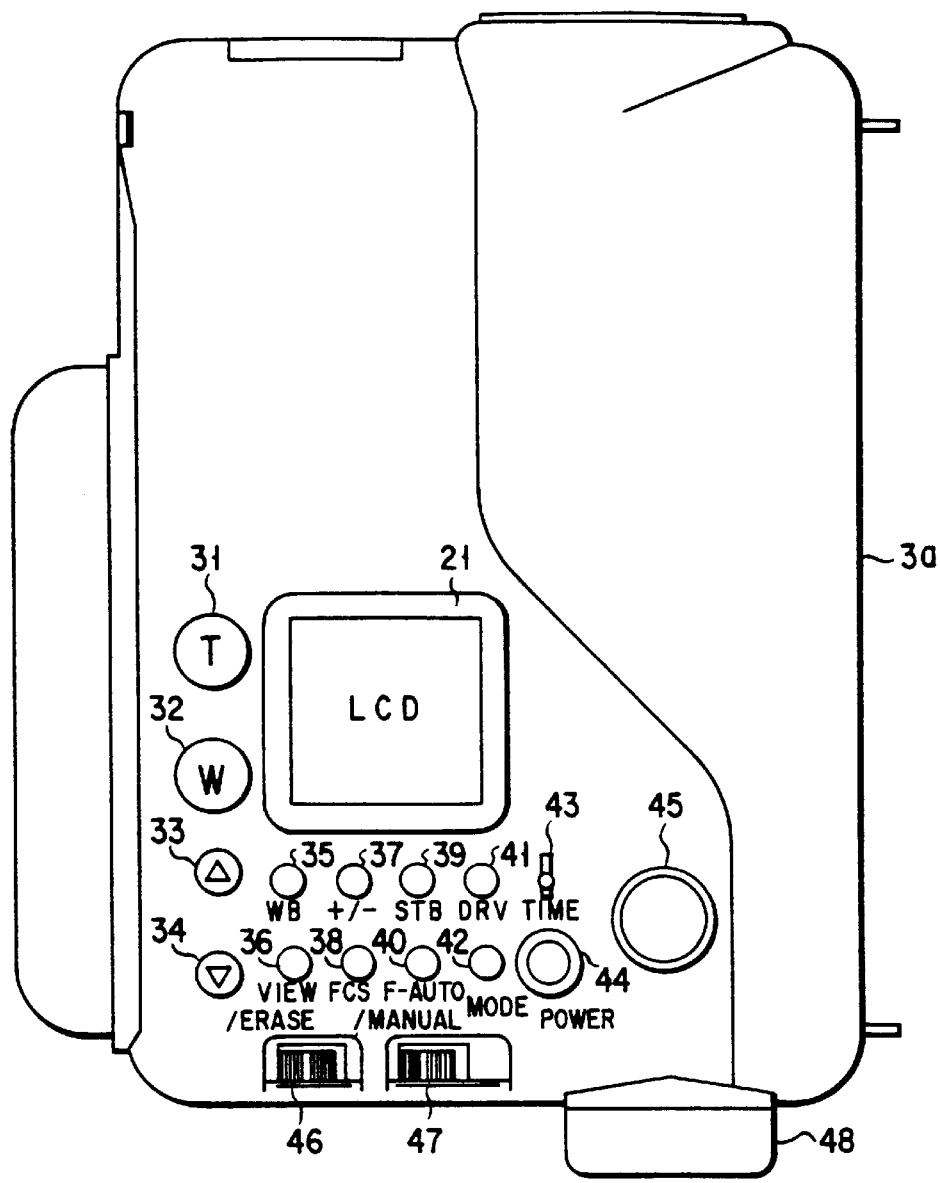
FIG. 3 is a view showing the outer appearance of the electronic still camera of this embodiment.
Figure 4:
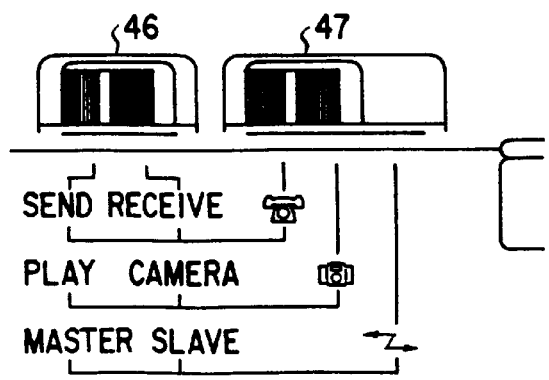
FIG. 4 is an enlarged view of the main part of the electronic still camera in FIG. 3.

FIG. 3 shows the outer appearance of the electronic still camera of this embodiment. FIG. 4 is an enlarged view of the main part of the camera.

FIGS. 3 and 4 show the layout of various operation switches of the operation section 22 or the like. The arrangement of the operation section 22 and the like will be described in detail below with reference to FIGS. 3 and 4.

As shown in FIG. 3, the above display section 21 is arranged on the central portion of the upper portion of a camera body 3a formed as a hand-held type having almost the same size as that of a general camera, and various manipulated and operating states (to be described later) are displayed on the display section 21.

A telephoto-range (T) switch 31 and a wide-range (W) switch 32 for a zooming operation are arranged on one side of the display section 21.

An up switch 33 and a down switch 34 are arranged below (in FIG. 3) the telephoto-range switch 31 and the wide-range switch 32.

When the camera is in the recording mode, the switches 33 and 34 are used for mode adjustment, e.g., fine white balance adjustment, a change in shutter speed, a change in exposure correction value, and selection of a focus area as a specific area in the manual focus mode, and the like. In the reproduction mode, the switches 33 and 34 are used for frame feed and return operations.

A white balance switch (WB switch) 35 is used to change the white balance mode in the recording mode.

A view/erase (VIEW/ERASE) switch 36 is used to reproduce an image recorded immediately before the switch is depressed in the recording mode, and is also used as a frame erase switch in the reproduction mode.

A +/−switch 37 is used to change the exposure mode in the recording mode.

A focus switch (FCS switch) 38 is used to change the autofocus (AF) or manual focus (MF) mode in the recording mode.

Every time the FCS switch 38 is depressed, the modes are switched in the following manner: "AF mode"→"MF mode"→"MF mode".

In the first MF mode, the up switch 33 is depressed to move the focus area upward, and the down switch 34 is depressed to move the focus area downward. In the second MF mode, the up switch 33 is depressed to move the focus area to the right, and the down switch 34 is depressed to move the focus area to the left. In this manner, the position of the focus area can be arbitrarily set.

An electronic flash switch (STB switch) 39 is used to change the electronic flash mode in the recording mode.

A full-auto/manual switch (F-AUTO/MANUAL switch) 40 is used to switch between a mode of automatically setting conditions and a mode of manually setting conditions.

A drive switch (DRV switch) 41 is used to change the recording speed mode. In the reproduction mode, the DRV switch 41 is used to change the reproducing speed.

A mode switch (MODE switch) 42 is used to set the compression mode or a non-compression mode in the recording mode. In the reproduction mode, the MODE switch 42 is used to, e.g., designate the ON screen mode of superposing a character display signal on a video signal output from an external terminal.

A time switch (TIME switch) 43 is used to set a date and time or turn on/off the buzzer 24.

A power switch (POWER switch) 44 is used to turn on/off the power supply for the camera.

A trigger switch 45 is used to start a photographing operation.

First and second switches 46 and 47 are arranged on an edge portion of the camera body which is located below the above operation switch group, as shown in FIG. 3. The first switch 46 is used to switch between the transmission (SEND) mode and the reception (RECEIVE) mode in an image transmitting operation, between the reproduction mode and the recording mode, and between the master (MASTER) mode and the slave (SLAVE) mode in a remote-controlling operation. The second switch 47 is used to switch between the telephone mode used for a transmitting operation, the camera mode used for a recording/reproducing operation, and the remote mode used for a remote-controlling operation.

These switches 46 and 47 are used as follows. Assume that the master mode is to be set. The second switch 47 is operated to the right in FIG. 4 to switch to the remote mode, and the first switch 46 is operated to the left in FIG. 4 to switch to the master mode.

When the slave mode is to be set, the first switch 46 in the above state is operated to the right in FIG. 4 to switch to the slave mode.

An eyepiece 48 for the EVF 11 of the camera is arranged on the right side of the second switch 47.

In this embodiment, similar electronic still cameras are used on the master and slave sides. However, as a modification embodiment, non-similar electronic still cameras may be used on the master and slave sides, each other. For example, as an electronic still camera on the slave side, a simplified camera having minimum necessary functions, e.g., an image pickup function, an image compression function, and a transmission function, may be used.

The operation procedures of the electronic image pickup system of this embodiment will be described below with reference to the flow charts of FIGS. 5 to 11.

Processing on the master side will be described with reference to FIG. 5. On the master side, the modem 2a is initialized in step S1. In step S2, an automatic dialing operation is performed to select a telephone number registered in advance and automatically dial it.

Processing on the slave side is performed as follows. On the slave side, similar to the master side, the modem 2b is initialized in step S11, and a wait state is set to wait for a telephone call (step S12).

On the master and slave sides, the communication partners are checked (steps S3 and S13).

On the master side, in step S4, the system controller 20 checks the state of the second switch 47. If the remote mode is set, the flow advances to step S5. If the remote mode is not set, the transmission/reception mode is set in step S6.

The system controller 20 transmits the mode information checked in step S4 to the slave side.

In step S5, the system controller 20 checks the state of the first switch 46. If the master mode is set, the flow advances to step S7. If the master mode is not set, the determination processing is repeated until the master mode is set.

On the slave side, the above mode information is received, and the system controller 20 checks whether the communication partner is in the remote mode (step S14). If the remote mode is set, the flow advances to step S15. If the remote mode is not set, the transmission/reception mode is set in step S16.

Similarly, in step S15, the system controller 20 checks the state of the first switch 46. If the slave mode is set, the flow advances to step S17. If the slave mode is not set, the determination processing is repeated until the slave mode is set.

On the master side, in step S7, operation data is transmitted to the slave side in the subroutine "operation data transmission processing". On the slave side, in step S17, the operation data is received in the subroutine "operation data reception processing".

Subsequently, in the subroutine "image data transmission processing" in step S18, image data is transmitted. On the master side, in step S8, the image data is received in the subroutine "image data reception processing".

In each of steps S9 and S19 on the master and slave sides, the subroutine "recording processing" is executed, and the processing is terminated.

When a plurality of electronic still cameras on the slave side are to be operated through the electronic still camera on the master side, the remote cameras are sequentially selected and automatically dialed to transmit control data thereto.

The telephone numbers and ID information of a plurality of remote cameras are registered in each camera.

As described above, in an image transmitting operation, image data from the electronic still camera on the slave side is received by the electronic still camera on the master side. As is apparent, however, image data picked up by the electronic still camera on the master side can be transmitted to the electronic still camera on the slave side, and the image data can be recorded on the electronic still camera on the slave side.

As described above, according to this embodiment, since similar electronic still cameras are used on the master and slave sides, the overall arrangement of the system can be simplified. For this reason, each camera body is advantageous in terms of portability and cost. In addition, since similar cameras are used, the operation of the camera on the master side is the same as that of the camera on the slave side. Therefore, any special new operations need not be learned, and high operability is provided.

Furthermore, since a telephone line is used, construction of a system is relatively easy, and the cost of equipment can be reduced.

As described above, if a simplified camera is used on the slave side, a further reduction in cost can be attained.

Figure 6:
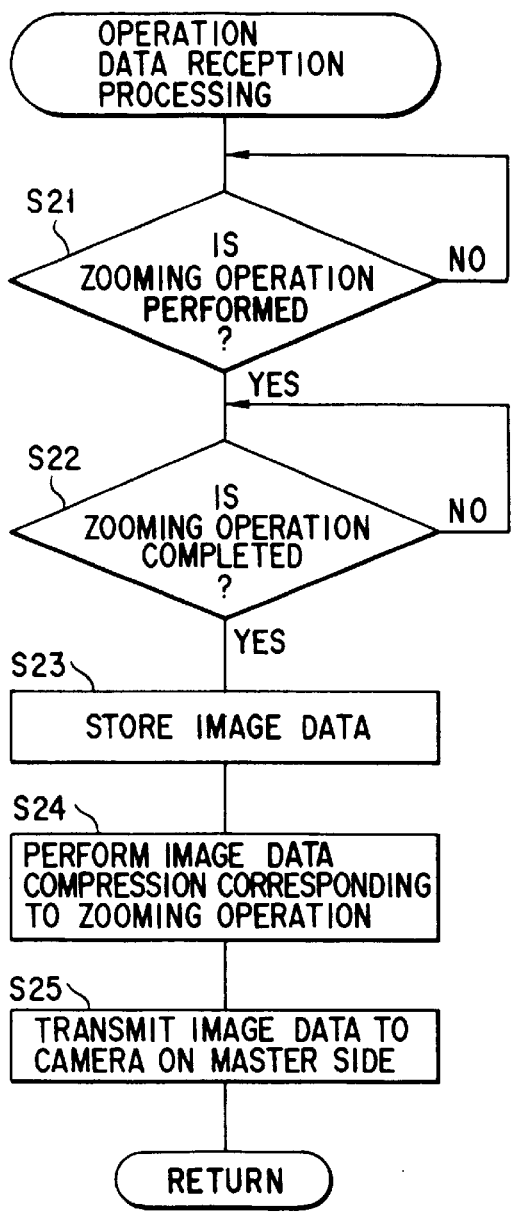
FIG. 6 is a flow chart showing one form of the subroutine "operation data reception processing" in FIG. 5.

FIG. 6 is a flow chart showing "operation data reception processing (1)" as one form of the subroutine "operation data reception processing" in step S17 in FIG. 15.

In step S21, the system controller 20 checks whether a zooming operation is performed by the telephoto-range switch 31 and the wide-range switch 32 on the master side. If the zooming operation is performed, the flow advances to step S22. If the zooming operation is not performed, the determination processing is repeated until the zooming operation is performed.

In step S22, the system controller 20 checks whether the zooming operation is completed. If the zooming operation is not completed, the determination processing is repeated. If the zooming operation is completed, image data is stored in the frame memory 15 in this embodiment (step S23).

The image data having undergone the zooming operation is compressed by the DCT/IDCT circuit 16 and the coder/decoder 17 to such an extent that the image can be checked (step S24). In step S25, the data input/output section 23 transmits this image data to the master side via the data input/output section 27 of the card connector, and the routine is terminated.

With this operation, since the image data having undergone the zooming operation is transmitted to the master side upon compression, i.e., reduction of the image data amount, the transmission time can be shortened, and a reduction in the cost of communication can be attained.

Figure 7:
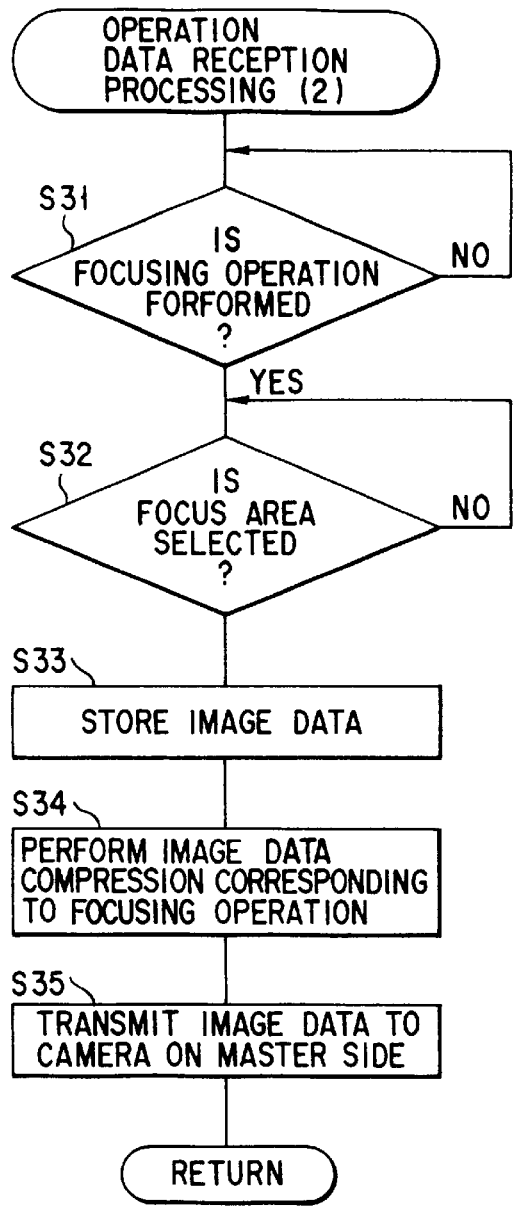
FIG. 7 is a flow chart showing another form of the subroutine "operation data reception processing" in FIG. 5.

FIG. 7 is a flow chart showing "operation data reception processing (2)" as another form of the subroutine "operation data reception processing" in step S17 in FIG. 15.

In step S31, the system controller 20 checks whether a focusing operation is performed by operating the FCS switch 38 and the like on the master side. If the focusing operation is performed, the flow advances to step S32. If the focusing operation is not performed, the determination processing is repeated until the focusing operation is performed.

In step S32, the system controller 20 checks whether a focus area as a specific area is selected. If no focus area is selected, the determination processing is repeated until a focus area is selected. If a focus area is selected, the image data is stored in the frame memory 15 in this embodiment (step S33).

Subsequently, the image data in the focus area which has undergone the focusing operation is compressed by the DCT/IDCT circuit 16 and the coder/decoder 17 to such an extent that the focusing degree of the image can be checked (step S34). In step S35, the above image data is transmitted to the master side via the data input/output section 23 or the data input/output section 27 of the card connector, and the routine is terminated.

As described above, since a focus area is selected, and the image data in the selected area is compressed to such an extent that the focusing degree can be checked, the information amount of the image for a check can be reduced, and the transmission time can be shortened. In addition, a reduction in the cost of communication can be attained.

Figure 5:
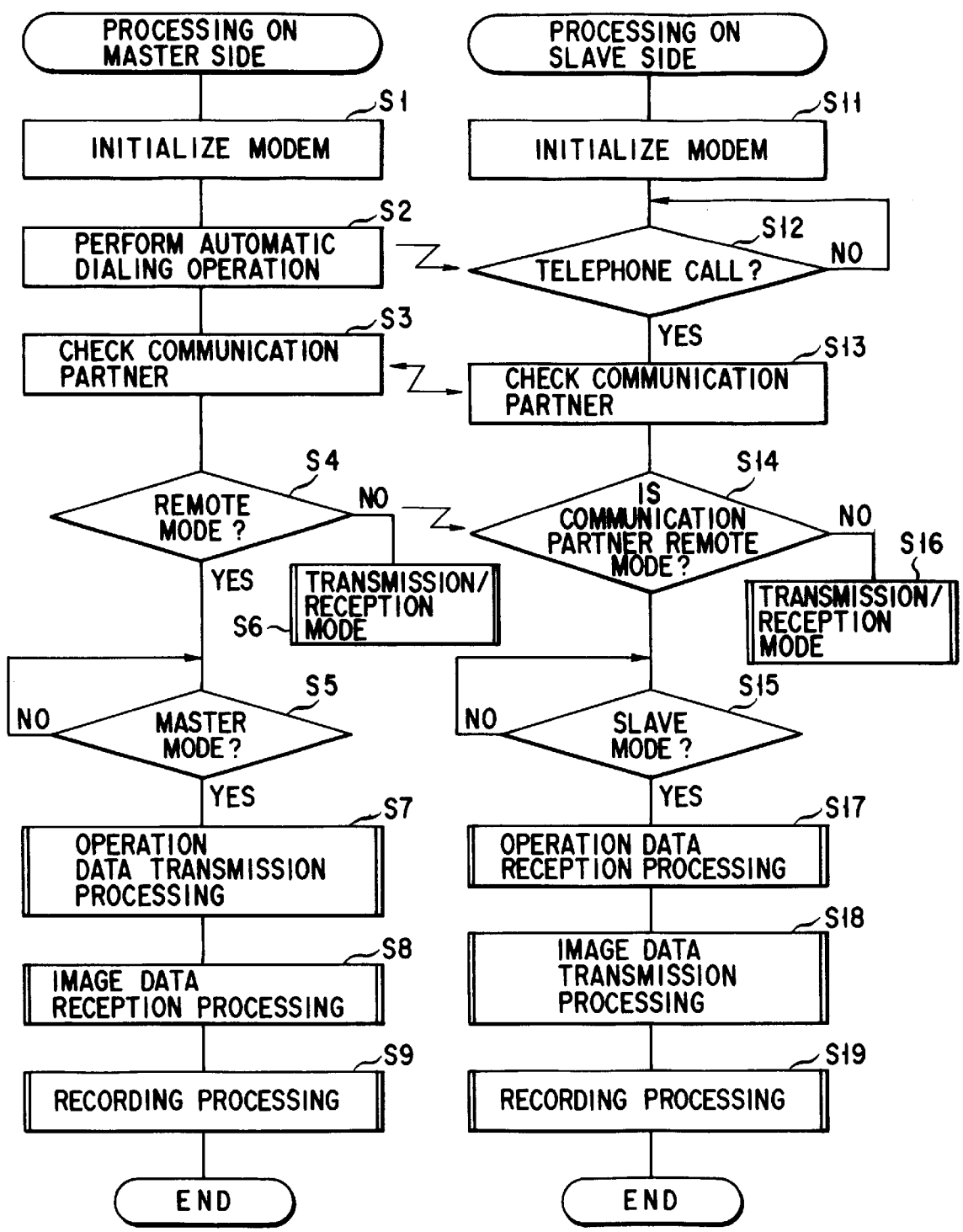
FIG. 5 is a flow chart showing the operation of the electronic image pickup system according to the embodiment in FIG. 1.
Figure 8:
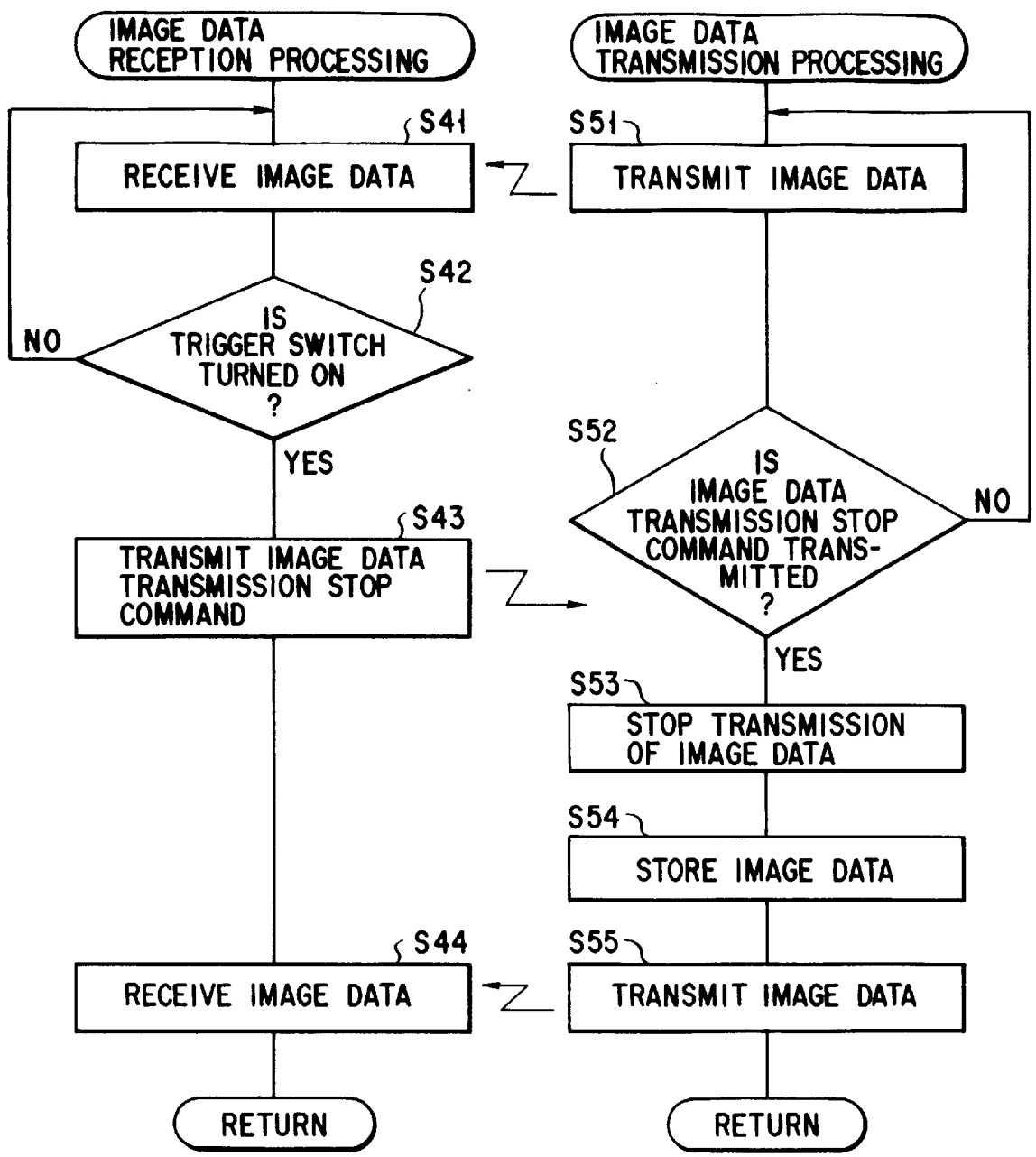
FIG. 8 is a flow chart showing the subroutine "image data reception processing" and the subroutine "image data transmission processing" in FIG. 5.

FIG. 8 is a flow chart showing the subroutine "image data reception processing" in step S8 in FIG. 5 and the subroutine "image data transmission processing" in step S18.

The camera on the slave side transmits image data to the master side in step S51, and the camera on the master side receives the image data in step S41.

On the master side, in step S42, the system controller 20 checks whether the trigger switch 45 is depressed. If the trigger switch 45 is not depressed, the flow returns to step S41. If the trigger switch 45 is depressed, the system controller 20 transmits an image data transmission stop command to the slave side via the data input/output section 23 or the data input/output section 27 of the card connector (step S43).

On the slave side, in step S52, the system controller 20 checks whether this image data transmission stop command is transmitted from the master side (the command is received on the slave side). If the command is not transmitted, the flow returns to step S51. If the command is transmitted, the system controller 20 performs control to stop the image data transmitting operation (step S53).

In this embodiment, the image data is stored in the frame memory 15 on the slave side (step S54), and the image data is transmitted to the master side in step S55. The subroutine "image data transmission processing" is terminated.

In addition, the image data transmitted from the slave side is received on the master side in step S44, and the subroutine "image data reception processing" is terminated.

According to the algorithm based on the above flow charts, even while image data is being transmitted from the slave side to the master side, when the trigger switch 45 is depressed, the transmitting operation is stopped, and a photographing operation is preferentially performed. A photographing operation can be performed without losing a shutter chance.

FIG. 9 is a flow chart showing the subroutine "recording processing" in steps S9 and S19.

In this embodiment, the IC memory card 19 as a recording medium is a detachable card. In step S61, the system controller 20 checks whether the IC memory card 19 is mounted. If the IC memory card 19 is not mounted, picked-up image data is transmitted to the master side (step S62). If the IC memory card 19 is mounted, the flow advances to step S63.

In step S63, the system controller 20 checks whether there is a registered frame corresponding to an image film constituted by a file header and image data. If there is no registered frame, the flow advances to step S62. If there is a registered frame, the above image data is recorded (step S64). The subroutine "recording processing" on the slave side is terminated.

On the master side, in step S71, the system controller 20 checks whether image data is transmitted from the slave side. If the image data is transmitted, the flow advances to step S72. If the image data is not transmitted, the determination processing is repeated.

Similar to the case of the slave side, in step S72, the system controller 20 checks whether the IC memory card 19 is mounted. If the IC memory card 19 is mounted, the system controller 20 checks whether any registered frame is left (step S73). If the IC memory card 19 is not mounted, a warning is produced to inform that a recording operation cannot be performed on either the master side or the slave side (step S74).

If it is determined in step S73 that no registered frame is present, the flow advances to step S74. If a registered frame is present, image data transmitted from the slave side is recorded (step S75), and the subroutine "recording processing" on the master side is terminated.

In this embodiment, with the operation based the above algorithm, even if the IC memory card 19 is not mounted in the electronic still camera 3 on the slave side, or no registered frame is present, image data can be transmitted to and recorded in the electronic still camera 1 on the master side.

Figure 10:
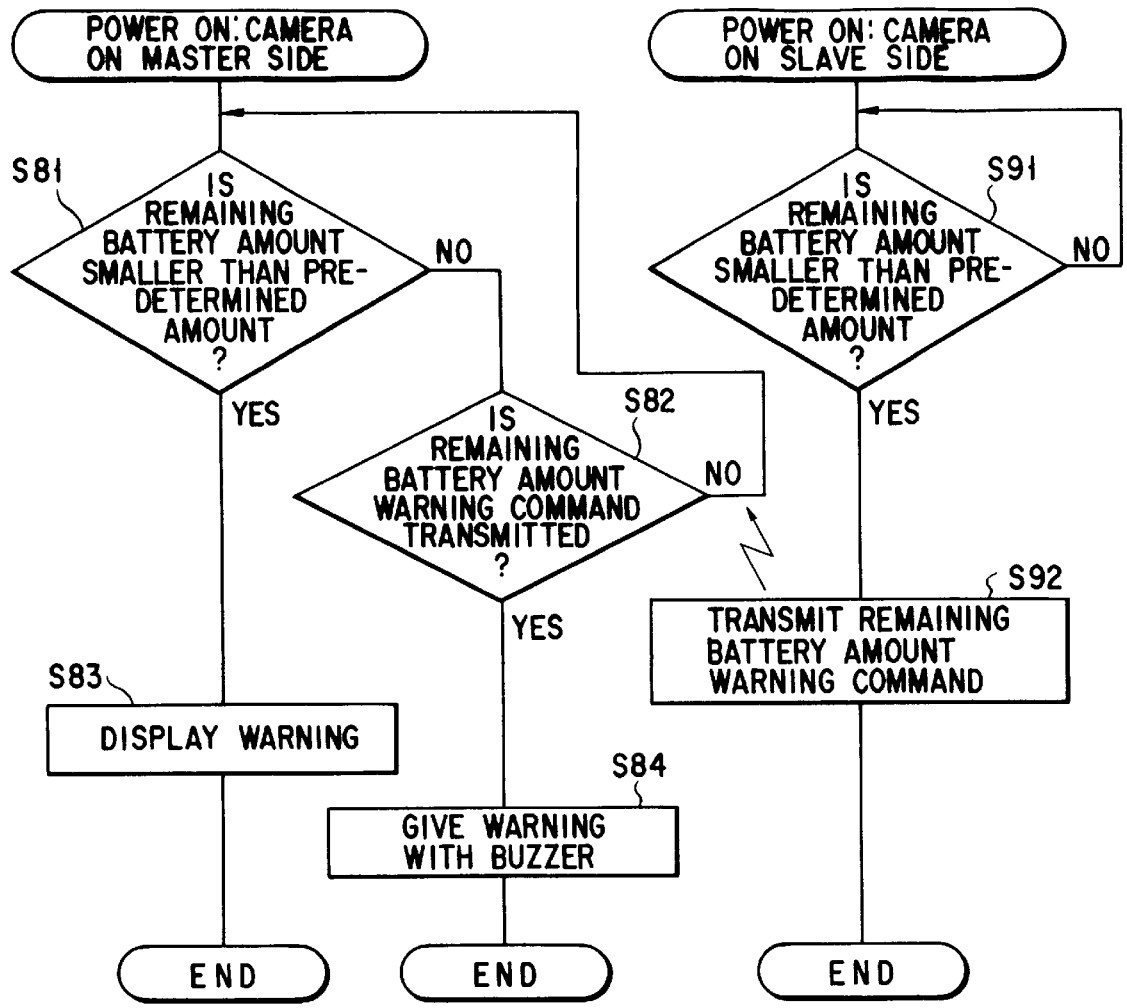
FIG. 10 is a flow chart showing remaining battery amount warning processing in the electronic image pickup system of the present invention.

FIG. 10 is a flow chart showing remaining battery amount warning processing on both the master and slave sides.

In each of the master and slave sides, the POWER switch 44 is turned on, and the remaining battery amount is detected by each battery voltage detector 25 in steps S81 and S91. The system controller 20 then checks whether each remaining battery amount is smaller than a predetermined amount.

If the remaining battery amount on the slave side is still larger than the predetermined amount, this determination processing is repeated. If the remaining battery amount is smaller than the predetermined amount, the system controller 20 transmits a warning command indicating a shortage of remaining battery amount to the master side (step S92), and the processing on the slave side is terminated.

If it is determined in step S81 that the remaining battery amount on the master side is still equal to or larger than the predetermined amount, the flow advances to step S82. If the remaining battery amount is smaller than the predetermined amount, the system controller 20 displays a warning of a shortage of remaining battery amount on the display section 21 (step S83), and the processing is terminated.

In step S82, the system controller 20 determines whether a warning command indicating a shortage of remaining battery amount is transmitted from the salve side. If the command is not transmitted, the flow returns to step S81. If the command is transmitted, a warning of a shortage of remaining battery amount on the slave side is given through the buzzer 24 on the master side (step S84). The processing is then terminated.

As described above, in the electronic still camera 1 on the master side, a warning of a shortage of remaining battery amount on the master side is displayed on the display section 21, and a warning of a shortage of remaining battery amount on the slave side is given through the buzzer 24. With this operation, a warning of a shortage of remaining battery amount on a specific side can be easily and accurately identified.

In the above embodiment, necessary information is transmitted through a telephone line. However, the form of the system is not limited to this. For example, necessary information may be transmitted through a line dedicated to an electronic image pickup system.

Figure 11:
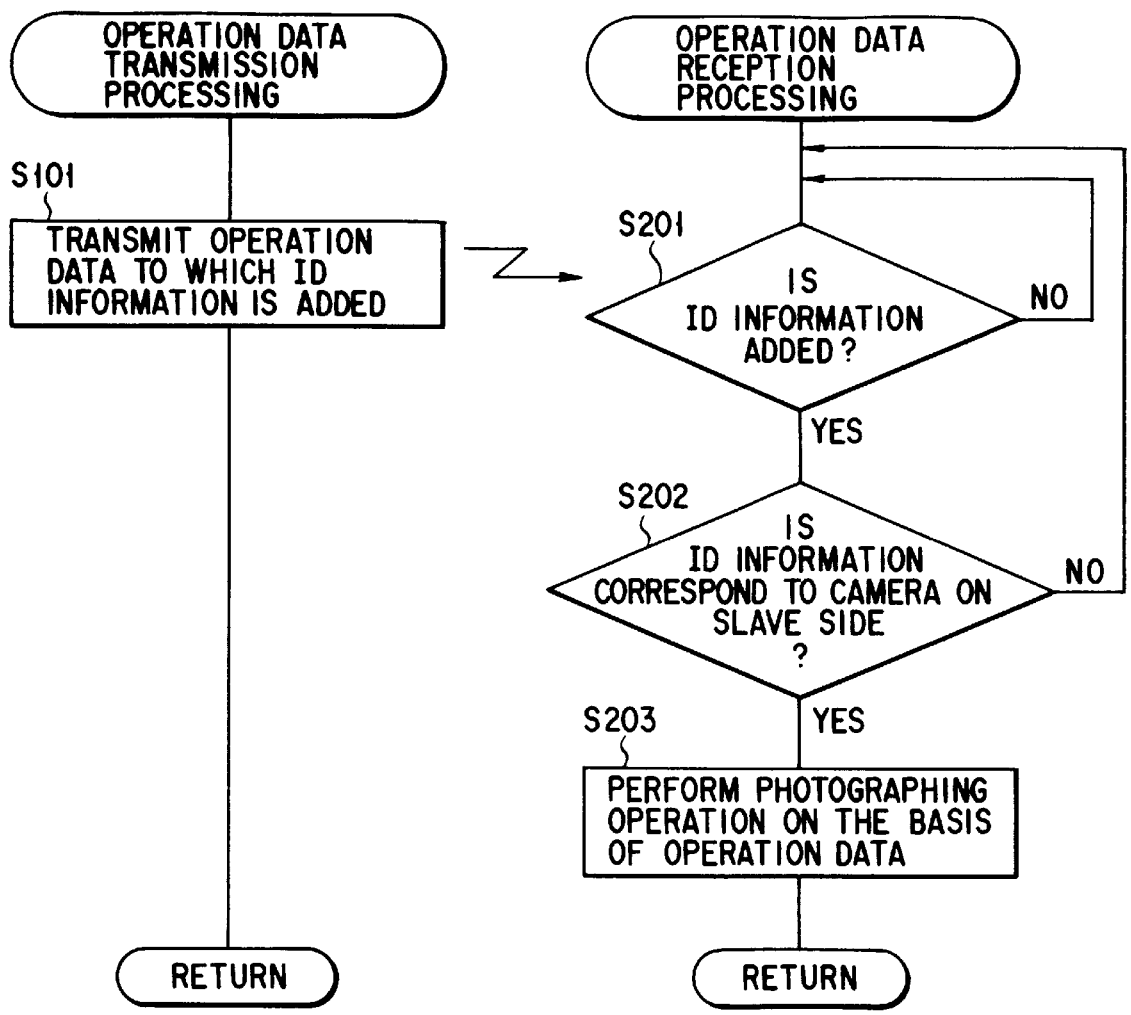
FIG. 11 is a flow chart showing modifications of the subroutine "operation data transmission processing" and the subroutine "operation data reception processing" in FIG. 5.

FIG. 11 is a flow chart showing a modification of the subroutine "operation data transmission processing" in step S7 and the subroutine "operation data reception processing" in step S17 in FIG. 5 which are required, e.g., when a single dedicated line is to be used or a plurality of electronic still cameras are connected through a common telephone line.

On the master side, in step S101, the system controller 20 adds ID information as the identification information of the corresponding electronic still camera to operation data, and transmits the resultant data to the slave side. The subroutine "operation data transmission processing" on the master side is then terminated.

On the slave side, in step S201, the system controller 20 checks whether ID information is added to the above transmitted operation data. If ID information is added, the flow advances to step S202. If no ID information is added, the determination processing is repeated until operation data to which ID information is added is received.

In step S202, the system controller 20 checks whether the above ID information corresponds to the camera on the slave side. If the ID information does not correspond to the camera on the slave side, the flow returns to step S201. If the ID information corresponds to the camera on the slave side, a photographing operation is performed on the basis of the operation data in step S203. The subroutine "operation data reception processing" on the slave side is terminated.

As described above, operation data to which ID information is added is transmitted to the slave side, and whether the transmitted ID information corresponds to the camera on the slave side can be checked on the salve side. For this reason, a plurality of electronic still cameras can be connected through a single dedicated line. Alternatively, a plurality of electronic still cameras can be connected through one telephone line.

Figure 12:
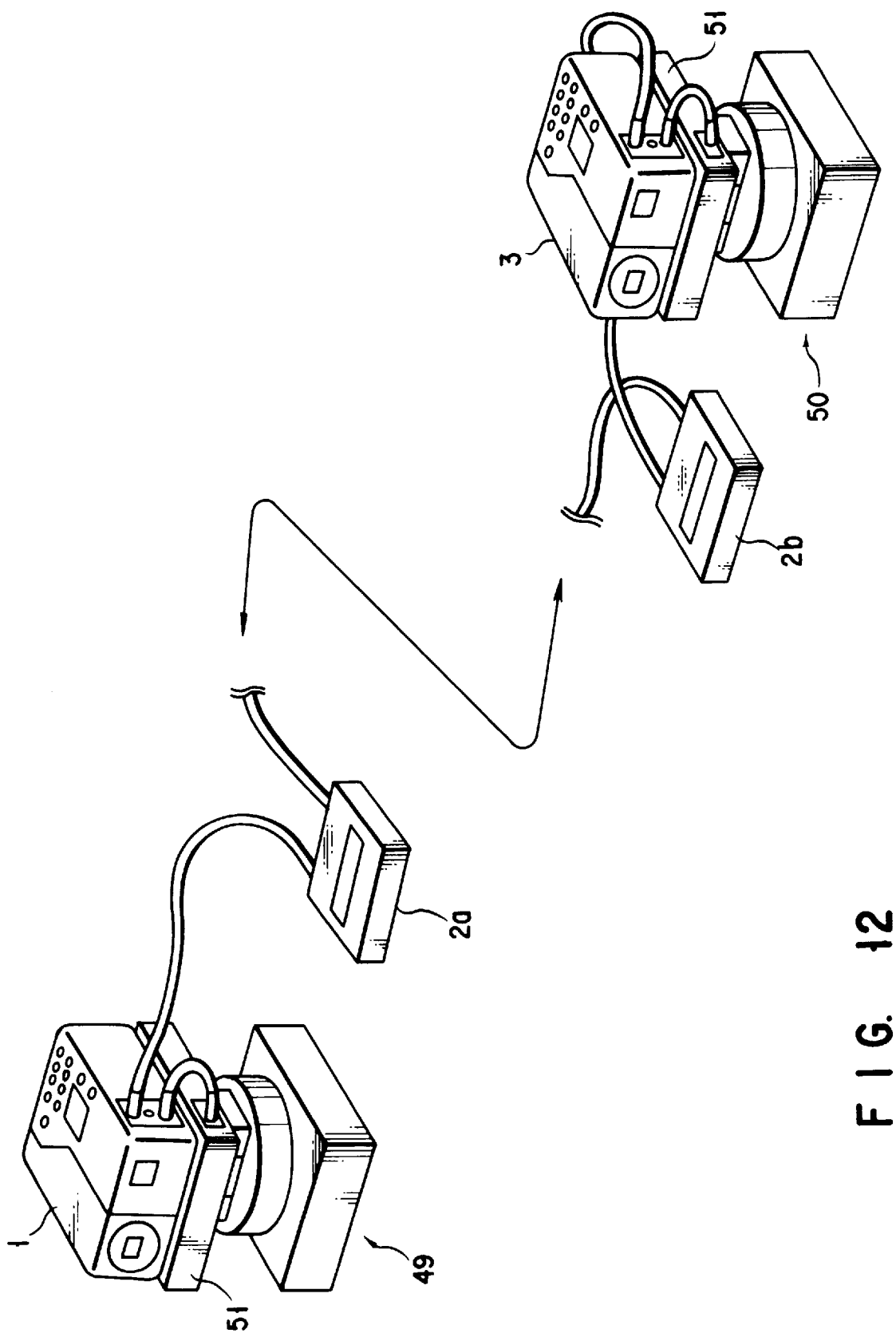
FIG. 12 is a perspective view showing the concept of an electronic image pickup system according to another embodiment of the present invention.

FIG. 12 shows the concept of an electronic image pickup system according to another embodiment of the present invention.

The same reference numerals in FIG. 12 denote the same parts as in FIG. 1, and a detailed description thereof will be omitted.

In this embodiment, a pan tilter 49 as an imaging visual field changing device is arranged to support one electronic still camera 1, and a pan tilter 50 is arranged to support the other electronic still camera 3. The electronic still cameras 1 and 3 and the pan tilters 49 and 50 are connected through a cable to exchange data.

Each of camera bases 51 on which the above electronic still cameras are fixed can be displaced in the vertical tilting directions and horizontal panning directions so as to change the imaging visual field of the camera.

Screw holes are formed in the bottom surfaces of the above pan tilters 49 and 50 to allow panheads (not shown) to be mounted thereon.

Figure 13:
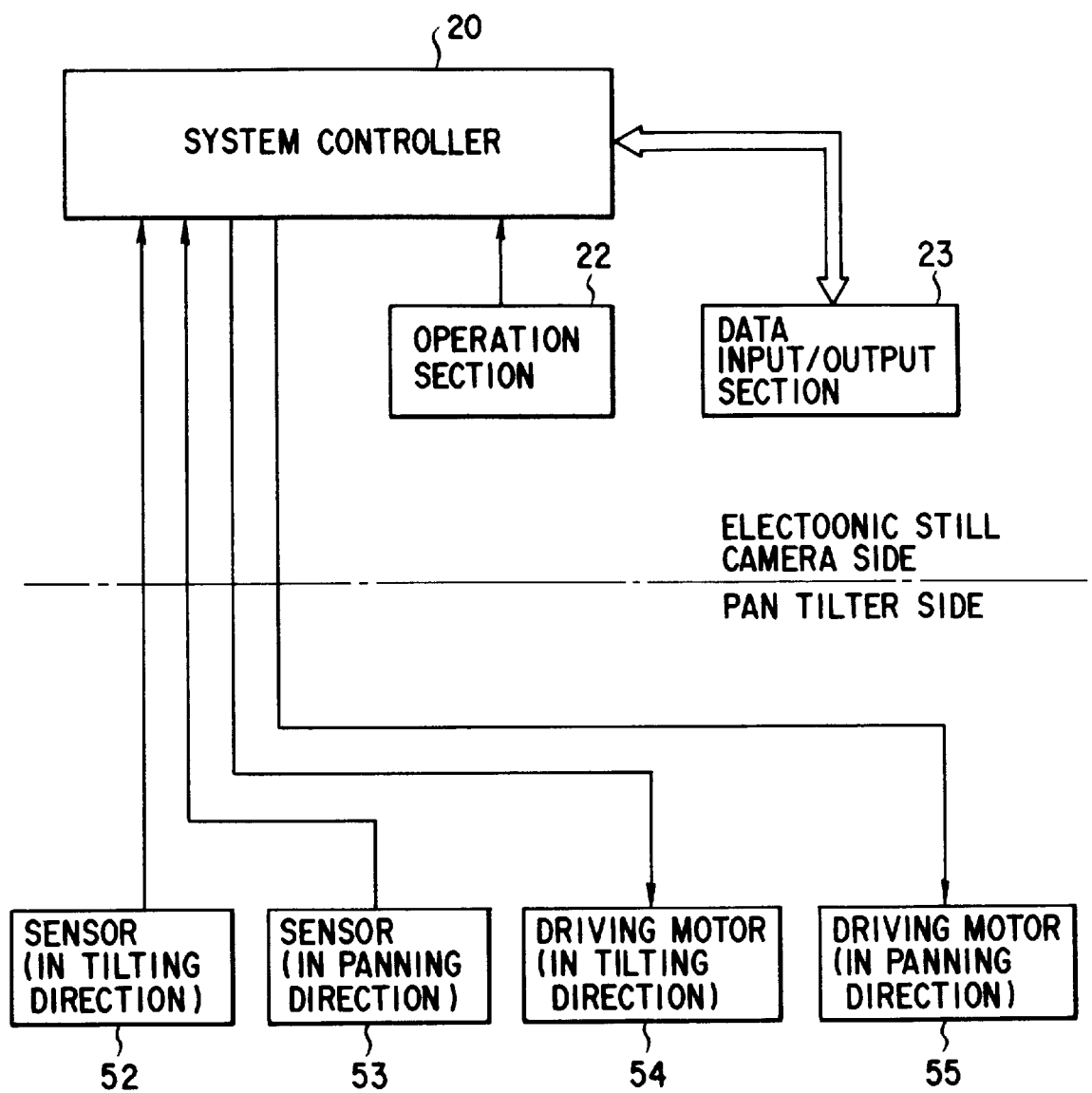
FIG. 13 is a block diagram showing the main part of the electronic image pickup system in FIG. 12.

The arrangement of the main part of each pan tilter will be described with reference to FIG. 13. The pan tilter has sensors 52 and 53. The sensor 52 detects the position (angle of elevation/angle of depression) of the pan tilter in the vertical tilting direction. The sensor 53 detects the position (horizontal pivot angle) of the pan tilter in the horizontal panning direction.

In addition, the pan tilter has driving motors 54 and 55. The driving motor 54 serves to drive the camera mounted on the pan tilter in the vertical tilting direction. The driving motor 55 serves to drives the camera mounted on the pan tilter in the horizontal panning direction.

In this embodiment, the electronic still camera 1 and the pan tilter 49 are arranged on the master side, whereas the electronic still camera 3 and the pan tilter 50 are arranged on the slave side. This system will be described below.

When a photographer moves the electronic still camera 1 fixed on the camera base 51 on the master side to an upper right position with respect to the photographer, the sensor 52 on the master side detects the position of the camera in the tilting direction, and the sensor 53 detects the position of the camera in the panning direction.

The position obtained as data for defining the imaging visual field is transmitted to the electronic still camera 1 via the above cable.

The position data transmitted from the pan tilter 49 is sent to the data input/output section 23 via the system controller 20, and is transmitted as operation data from the data input/output section 23 to the electronic still camera 3 on the slave side.

When a photographing operation is performed during the operation of the pan tilter, the system controller 20 adds the position data to the operation data, and transmits the resultant operation data.

The system controller 20 on the slave side controls the driving motors 54 and 55 of the pan tilter 50 on the slave side on the basis of the transmitted position data. That is, the system controller 20 can drive the pan tilter 50 on the slave side in accordance with the operation of the pan tilter 49 on the master side.

Alternatively, the pan tilter 49 may not be arranged on the master side. Instead, some of the operation switches of the electronic still camera 1 on the master side may be designed as the operation switches of the pan tilter, thereby controlling and driving the pan tilter 50 on the slave side.

For example, the pan tilter 50 on the slave side may be driven in the horizontal panning direction with the telephoto-range switch 31 and the wide-range switch 32 on the master side, and may be driven in the vertical tilting direction with the up switch 33 and the down switch 34.

According to the above description, the pan tilters on the master and slave sides are similar, and the pan tilter 50 on the slave side takes the same posture (position) as that of the pan tilter 49 on the master side when the camera base 51 of the pan tilter 49 on the master side is moved. For this reason, any special new operation need not be learned, and the posture of the camera on the slave side can be intuitively grasped, thereby providing good operability.

In addition, if operation switches of the electronic still camera 1 on the master side are designed to serve as the operation section of a pan tilter so as to drive the pan tilter 50 on the slave side, any apparatus for remote-controlling the pan tilter or any operation switch dedicated thereto is not required, and the arrangements of the system and the operation section can be simplified.

In each embodiment described above, transmission of various data through a transmission path (line) is performed according to the proper form of a serial data string.

In the system of the present invention, data which can be transmitted include data associated with a wide variety of fields, e.g., operation data associated with the operations of a camera and a pan tilter like those described above, image data, speech data, industrial measurement data such as a temperature, an illuminance, and a liquid level, and data associated with environmental measurement such as water quality, air, vibration, and noise.

As has been described above, according to the electronic image pickup system of the present invention, the overall arrangement of the system can be simplified, and transmission of image data and remote-controlling operations can be mutually performed between the respective electronic image pickup apparatuses in the system.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An electronic still camera system including a plurality of electronic still cameras capable of mutually exchanging information through communication means, the electronic still camera system comprising:

at least a first electronic still camera having an operation section said first electronic still camera being positioned on an operating side of said system, said first electronic still camera being selected from said plurality of electronic still cameras and initiating an exchange of information when said operation section is activated; and at least a second electronic still camera being positioned on an operated side of said system, said second electronic still camera being selected from said plurality of electronic still cameras and exchanging information with said first electronic still camera in response to activation of said operation section;

wherein said first electronic still camera comprises control data transmission means for transmitting control data which defines at least one of photographing and recording operations of said second electronic still camera in response to an activation of said operation section;

said second electronic still camera on the operated side comprising:

control data reception means for receiving the control data transmitted by said first electronic still camera, and photographing operation control means for performing a photographing operation in accordance with the control data received by said control data reception means, and each of said first and second electronic still cameras comprising image data transmission means for transmitting image data obtained by one of said first and second still cameras upon photoelectric conversion and photography to the other of said first and second electronic still cameras; and a change-over means capable of selectively taking a first state or a second state, and wherein the electronic still camera is exclusively assigned to operate as said first electronic still camera while said change-over means takes said first state thereof, and the electronic still camera is exclusively assigned to operate as said second electronic still camera while said change-over means takes said second state thereof.

2. A system according to claim 1, wherein said first electronic still camera comprises recording means for recording image data transmitted from said image data transmission means when no recording medium is arranged in said second electronic still camera.

3. A system according to claim 1, wherein said first electronic still camera comprises recording means for recording image data transmitted from said image data transmission means when a recording medium in said second electronic still camera undergoes a shortage of a remaining capacity.

4. A system according to claim 1, wherein said second electronic still camera comprises check image data transmission means for, when a zooming operation is performed by said first electronic still camera, compressing image information to such an extent that an image having undergone the zooming operation can be checked, and transmitting the image information to said first electronic still camera.

5. A system according to claim 1, wherein said second electronic still camera comprises specific area selection means for selecting a specific area to be subjected to a focusing operation by said second electronic still camera, said focusing operation being conducted in accordance with an activation of said operation section when a focusing operation is to be performed by said photographing operation control means of said second electronic still camera in accordance with the control data corresponding to a focusing operation in said first electronic still camera, and specific area information transmission means for compressing image information to such an extent that a focusing degree of the specific area can be checked, and transmitting the compressed information to said first electronic still camera.

6. A system according to claim 1, wherein said second electronic still camera comprises photographing operation preference means for preferentially performing a photographing operation with respect to a transmitting operation upon reception of control data indicating depression of a trigger switch of said operation section of said first electronic still camera during transmission of image data to said first electronic still camera.

7. A system according to claim 1, wherein said control data transmission means of said first electronic still camera adds identification information of said second electronic still camera to the control data, and transmits the control data to said at least second electronic still camera of the plurality of electronic still cameras on the operated side as an indication of at least one destination, each of said at least second electronic still cameras comprising self-recognition means for recognizing the control data corresponding to said second electronic still camera on the basis of the identification information.

8. A system according to claim 1, wherein said change-over means comprises:

a first change-over switch for switching between a master mode and a slave mode in a remote-controlling operation, and wherein the electronic still camera system operates as said at least the first electronic still camera in said master mode, and operates as said at least the second electronic still camera in said slave mode; and a second change-over switch for switching between a first position for causing said remote-controlling operation and a second position for causing another operation of the electronic still camera system.

9. A system according to claim 1, wherein at least one of said plurality of electronic still cameras further comprises:

an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data.

10. A system according to claim 1, wherein at least one of said plurality of electronic still cameras further comprises:
an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data, or to another electronic circuit for supporting communication between the at least one of the plurality of electronic still cameras and another external device connected thereto.

11. A system according to claim 1, wherein at least one of said plurality of electronic still cameras further comprises:
an I/O data bus of PCMCIA scheme for providing a data stream conduit for inter-connecting at least two of a card connector of the at least one of said plurality of electronic still cameras, a built-in memory, a first data input/output section, and a second data input/output section.

12. A system according to claim 1, wherein said first electronic still camera comprises warning means for receiving warning information of a remaining battery amount of said second electronic still camera, and generating a warning signal in a form different from that of a warning signal of a remaining battery amount of said first electronic still camera.

13. A system according to claim 12, wherein said first electronic still camera generates said warning signal of said remaining battery amount of said electronic still camera with a buzzer of said first electronic still camera.

14. A system according to claim 1, wherein at least one of said plurality of electronic still cameras further comprises;
an I/O data bus of PCMCIA scheme for providing a data stream conduit from a card connector of the at least one camera to a system controller for controlling overall camera system operation, or to another circuit in the at least one camera for data processing or storing, said card connector being adaptable to various cards for supporting communication between the at least one camera and any other external device connected thereto.

15. A system according to claim 14, wherein said card connector is adaptable for coupling to a card for supporting radio transmission/reception.

16. A system according to claim 1, wherein said second electronic still camera comprises drive control means for controlling a driving operation of an imaging visual field changing device on the basis of the control data received from said control data reception means, said imaging visual field changing device being set to support said second electronic still camera.

17. A system according to claim 16, wherein said first electronic still camera comprises operation means for driving said imaging visual field changing device in a horizontal panning direction with telephoto- and wide-range operation elements and a driving operation in a vertical tilting direction with up and down operation elements of said first electronic still camera.

18. A system according to claim 16, further comprising data addition means for adding to the control data, data for supporting said first electronic still camera on an imaging visual field changing device similar to said imaging visual field changing device for supporting said second electronic still camera and for defining an imaging visual field corresponding to an operation of said imaging visual field changing device on the operating side.

19. A system according to claim 1, wherein at least one of said first and second electronic still cameras includes a recording medium for recording image data which is to be photographed or transmitted.

20. A system according to claim 19, wherein said recording medium is incorporated and fixed in a camera body of at least one of said electronic still cameras.

21. A system according to claim 19, wherein said recording medium is detachably mounted in a camera body of at least one of said electronic still cameras.

22. A system according to claim 19, wherein the recording medium includes a first medium incorporated and fixed in a camera body and a second medium detachably mounted in said camera body, said first and second media being connected to each other via a data bus of the same signal form.

23. A system according to claim 1, wherein each of said first and second electronic still cameras comprise a data input/output section for input and output of the control data and the image data.

24. A system according to claim 23, wherein said data input/output section is a card connector.

25. A system according to claim 23, wherein said data input/output section is a connector different from a card connector.

26. A system according to claim 23, wherein said data input/output section includes a card connector and a connector different from a card connector.

27. An electronic still camera system including a plurality of electronic still cameras capable of mutually exchanging information through communication means, the electronic still camera system comprising:
an electronic still camera on an operating side, said electronic still camera being selected from said plurality of electronic still cameras and initiating an exchange of information; and
at least one electronic still camera on an operated side, said at least one electronic still camera being selected from said plurality of electronic still cameras and exchanging information in response to an operation of said electronic still camera on the operating side;
wherein said electronic still camera on the operating side comprises control data transmission means for transmitting control data for defining at least one of photographing and recording operations to said electronic still camera on the operated side in response to an operation with respect to the operation switch of said electronic still camera on the operating side;
said at least one electronic still camera on the operated side comprising:
control data reception means for receiving the control data; and
photographing operation control means for performing a photographing operation in accordance with the control data received by said control data reception means;
each of said electronic still cameras on the operated or operating side comprising:
image data transmission means for transmitting image data obtained by said respective electronic still camera upon photoelectric conversion and photography to the other of said electronic still camera; and a change-over means capable of selectively taking a first state or a second state, and wherein the electronic still camera is exclusively assigned to operate as said electronic still camera on the operating side while said change-over means takes said first state thereof and the electronic still camera is exclusively assigned to operate as said electronic still camera on the operated side while said change-over means takes said second state thereof.

28. A system according to claim 27, wherein said change-over means comprises:

a first change-over switch for switching between a master mode and a slave mode in a remote-controlling operation, and wherein the electronic still camera system operates as the electronic still camera on the operating side in said master mode, and operates as the electronic still camera on the operated side in said slave mode; and a second change-over switch for switching between a first position for causing said remote-controlling operation and a second position for causing another operation of the electronic still camera in this system.

29. A system according to claim 27, wherein at least one of said plurality of electronic still cameras further comprises:

an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data.

30. A system according to claim 27, wherein at least one of said plurality of electronic still cameras further comprises:

an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data, or to another electronic circuit for supporting communication between the at least one of the plurality of electronic still cameras and another external device connected thereto.

31. A system according to claim 27, wherein at least one of said plurality of electronic still cameras further comprises:

an I/O data bus of PCMCIA scheme for providing a data stream conduit for inter-connecting at least two of a card connector of the at least one of said plurality of electronic still cameras, a built-in memory, a first data input/output section, and a second data input/output section.

32. A system according to claim 27, wherein at least one of said plurality of electronic still cameras further comprises:

an I/O data bus of PCMCIA scheme for providing a data stream conduit from a card connector of the at least one camera to a system controller for controlling overall camera system operation, or to another circuit in the at least one camera for data processing or storing, said card connector being adaptable to various cards for supporting communication between the at least one camera and any other external device connected thereto.

33. A system according to claim 32, wherein said card connector is adaptable for coupling to a card for supporting radio transmission/reception.

34. An electronic still camera system including a plurality of electronic still cameras capable of mutually exchanging information through communication means, the electronic still camera system comprising:

a first electronic still camera on an operating side having an operation switch, said first camera being selected from said plurality of electronic still cameras and initiating an exchange of information; and at least a second electronic still camera of the plurality of electronic still cameras on an operated side, said at least second electronic still camera being selected from said plurality of electronic still cameras and exchanging information in response to an operation of said first electronic still camera;

wherein said first electronic still camera comprises:

control data generating means for generating control data based on which photographing operations are controlled in response to operations of predetermined operation switches; and control data transmitting means for transmitting the control data generated by the control data generating means to said at least second electronic still camera, thus permitting said first electronic still camera to work as a camera corresponding to said at least second electronic still camera, when said first electronic still camera is set in a state capable of transmitting data to said at least second electronic still camera and where the at least second electronic still camera has a photographing operation switch similar to that of the first electronic still camera;

wherein each of sail first and second electronic still cameras comprises change-over means capable of selectively taking a first state or a second state, and wherein the electronic still camera is exclusively assigned to operate as said first electronic still camera while said change-over means takes said first state thereof, and the electronic still camera system is exclusively assigned to operate as said second electronic camera while said change-over means takes said second state thereof.

35. A system according to claim 34, wherein at least one of said first and at least second electronic still cameras includes a recording medium for recording image data photographed or transmitted.

36. A system according to claim 34, wherein said at least one of said first and at least second electronic still cameras comprise a data input/output section for the control data and the image data.

37. A system according to claim 34, wherein said first electronic still camera comprises recording means for recording image data transmitted from image data transmission means of said at least second electronic still camera when no recording medium is arranged in said at least second electronic still camera.

38. A system according to claim 34, wherein said first electronic still camera comprises recording means for recording image data transmitted from image data transmission means of said at least second electronic still camera when a recording medium in said at least second electronic still camera on the operated side undergoes a shortage of a remaining capacity.

39. A system according to claim 34, wherein said first electronic still camera comprises warning means for receiving warning information of a remaining battery amount of said at least second electronic still camera, and generating a warning in a form different from that of a warning of a remaining battery amount of said first electronic still camera.

40. A system according to claim 34, wherein said control data transmitting means of said electronic still camera on the operating side adds identification information of said at least second electronic still camera to the control data, and transmits the data to at least the second electronic still camera of the plurality of electronic still cameras on the operated side as a destination, and each of the plurality of electronic still cameras on the operated side comprises self-recognition means for recognizing the control data corresponding to said electronic still camera on the basis of the identification information.

41. A system according to claim 34, wherein said change-over means comprises:
a first change-over switch for switching between a master mode and a slave mode in a remote-controlling operation, and wherein the electronic still camera system operates as said first electronic still camera in said master mode, and operates as said second electronic still camera in said slave mode; and
a second change-over switch for switching between a first position for causing said remote-controlling operation and a second position for causing another operation of the electronic still camera system.

42. A system according to claim 34, wherein at least one of said plurality of electronic still cameras further comprises:
an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data.

43. A system according to claim 34, wherein at least one of said plurality of electronic still cameras further comprises:
an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data, or to another electronic circuit for supporting communication between the at least one of the plurality of electronic still cameras and another external device connected thereto.

44. A system according to claim 34, wherein at least one of said plurality of electronic still cameras further comprises:
an I/O data bus of PCMCIA scheme for providing a data stream conduit for inter-connecting at least two of a card connector of the at least one of said plurality of electronic still cameras, a built-in memory, a first data input/output section, and a second data input/output section.

45. A system according to claim 34, wherein at least one of said plurality of electronic still cameras further comprises:
an I/O data bus of PCMCIA scheme for providing a data stream conduit from a card connector of the at least one camera to a system controller for controlling overall camera system operation, or to another circuit in the at least one camera for data processing or storing, said card connector being adaptable to various cards for supporting communication between the at least one camera and any other external device connected thereto.

46. A system according to claim 45, wherein said card connector is adaptable for coupling to a card for supporting radio transmission/reception.

47. An electronic still camera system including a plurality of electronic still cameras capable of mutually exchanging information through communication means, comprising:
a first electronic still camera on an operating side having an operation switch and control data generating means, said first electronic still camera being selected from said plurality of electronic still cameras and initiating an exchange of information; and
at least a second electronic still camera on an operated side, said at least second camera being selected from said plurality of electronic still cameras and exchanging information in response to an operation of said first electronic still camera;
wherein said at least second electronic still camera comprises;
control data receiving means for receiving control data generated by the control data generating means of said first electronic still camera and used for controlling photographic operations, thus permitting said at least second electronic still camera to work as a camera corresponding to said first electronic still camera, when said at least second electronic still camera is set in a state capable of receiving data from said first electronic still camera and where said second electronic still camera has a photographing operation switch similar to that of said first electronic still camera; and
photographing operation controlling means for performing photographing operations determined by the control data received by said control data receiving means,
wherein each of said first-and second electronic still cameras comprises change-over means capable of selectively taking a first state or a second state, and wherein the electronic still camera is exclusively assigned to operate as said first electronic still camera while said change-over means takes said first state thereof, and the electronic still camera is exclusively assigned to operate as said second electronic still camera while said change-over means takes said second state thereof.

48. A system according to claim 47, wherein at least one of said first and at least second electronic still cameras includes a recording medium for recording image data to be photographed or transmitted.

49. A system according to claim 47, wherein each of said plurality of electronic still cameras comprises a data input/output section for the control data and the image data.

50. A system according to claim 47, wherein said at least second electronic still camera comprises check image data transmission means for, when a zooming operation is performed by said first electronic still camera, compressing image information to such an extent that an image having undergone the zooming operation can be checked, and transmitting the image information to said first electronic still camera.

51. A system according to claim 47, wherein said at least second electronic still camera comprises specific area selection means for selecting a specific area to be subjected to a focusing operation i said at least second electronic still camera in accordance with an operation of said first electronic still camera when a focusing operation is to be performed by said photographing operation control means of said second electronic still camera in accordance with the control data corresponding to a focusing operation in said first electronic still camera, and specific area information transmission means for compressing image information to such an extent that a focusing degree of the specific area can be checked, and transmitting the compressed information to said first electronic still camera.

52. A system according to claim 47, wherein said at least second electronic still camera comprises photographing operation preference means for preferentially performing a photographing operation with respect to a transmitting operation upon reception of control data indicating depression of a trigger switch from said first electronic still camera during transmission of image data to said first electronic still camera.

53. A system according to claim 47, wherein said first electronic still camera comprises warning means for receiving information of a remaining battery amount of said at least second electronic still camera, and generating a warning in a form different from that of a warning of a remaining battery amount of said first electronic still camera.

54. A system according to claim 47, wherein said control data generating means of said first electronic still camera adds identification information of said at least second electronic still camera to the control data, and transmits the data to each of the plurality of electronic still cameras on the operated side, each of said electronic still cameras on the operated side comprise self-recognition means for recognizing the control data corresponding to a respective electronic still camera on the operated side on the basis of the identification information.

55. A system according to claim 47, wherein said at least electronic still camera comprises drive control means for controlling a driving operation of an imaging visual field changing device on the basis of the control data received from said control data receiving means, said imaging visual field changing device being set to support said second electronic camera on the operated side.

56. A system according to claim 47, wherein said change-over means comprises:

a first change-over switch for switching between a master mode and a slave mode in a remote-controlling operation, and wherein the electronic still camera system operates as said first electronic still camera in said master mode, and operates as said second electronic still camera in said slave mode; and a second change-over switch for switching between a first position for causing said remote-controlling operation and a second position for causing another operation of the electronic still camera system.

57. A system according to claim 47, wherein at least one of said plurality of electronic still cameras further comprises:

an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data.

58. A system according to claim 47, wherein at least one of said plurality of electronic still cameras further comprises:

an I/O data bus of PCMCIA scheme for providing a data stream conduit from a card connector of the at least one of said plurality of electronic still cameras to a system controller for controlling overall electronic still camera system operation, or to another circuit in the at least one of said plurality of electronic still cameras for data processing or storing, said card connector being adaptable to an IC memory card for storing image data, or to another electronic circuit for supporting communication between the at least one of the plurality of electronic still cameras and another external device connected thereto.

59. A system according to claim 47, wherein at least one of said plurality of electronic still cameras further comprises:

an I/O data bus of PCMCIA scheme for providing a data stream conduit for inter-connecting at least two of a card connector of the at least one of said plurality of electronic still cameras, a built-in memory, a first data input/output section, and a second data input/output section.

60. A system according to claim 47, wherein at least one of said plurality of electronic still cameras further comprises:

an I/O data bus of PCMCIA scheme for providing a data stream conduit from a card connector of the at least one camera to a system controller for controlling overall camera system operation, or to another circuit in the at least one camera for data processing or storing, said card connector being adaptable to various cards for supporting communication between the at least one camera and any other external device connected thereto.

61. A system according to claim 60, wherein said card connector is adaptable for coupling to a card for supporting radio transmission/reception.

\* \* \* \* \*